United States Patent
Vernon et al.

[11] Patent Number: 5,874,149
[45] Date of Patent: Feb. 23, 1999

[54] HEAT SEALING OF THREAD TO A WEB

[75] Inventors: Geoffrey William Vernon, Kenilworth; James Goodwin, Coventry; Andrew Cleall, Radford; Thomas William Bailey, Berkswell, all of England

[73] Assignee: Thomas J. Lipton Co., Division of Conopco, Inc., Englewood Cliffs, N.J.

[21] Appl. No.: 795,050

[22] Filed: Feb. 5, 1997

Related U.S. Application Data

[60] Continuation of Ser. No. 434,956, May 4, 1995, abandoned, which is a division of Ser. No. 122,034, Sep. 14, 1993, Pat. No. 5,439,529.

[30] Foreign Application Priority Data

Sep. 17, 1992 [GB] United Kingdom ............... 9219657

[51] Int. Cl.⁶ ............................................. B65D 29/04
[52] U.S. Cl. ........................... 428/101; 426/77; 426/82; 426/83; 426/394; 428/77; 428/78; 428/79; 428/103; 428/124; 428/192; 428/194
[58] Field of Search ........................ 428/40.1, 77, 78, 428/79, 101, 103, 124, 192, 194; 426/77, 82, 83, 394

[56] References Cited

U.S. PATENT DOCUMENTS

| | | | |
|---|---|---|---|
| 2,149,713 | 3/1939 | Webber | 99/77.1 |
| 2,335,159 | 11/1943 | Salfisberg | 229/53 |
| 2,468,464 | 4/1949 | Salfisberg | 206/0.5 |
| 2,556,383 | 6/1951 | Williams | 93/91 |
| 2,767,113 | 10/1956 | Bower | 154/93 |
| 2,791,505 | 5/1957 | Barnett | 99/77.1 |
| 2,852,389 | 9/1958 | Johnson | 99/77.1 |
| 2,861,403 | 11/1958 | Weisman | 53/14 |
| 2,925,171 | 2/1960 | Eaton | 206/0.5 |
| 2,939,257 | 6/1960 | Bartelt | 53/134 |
| 3,143,834 | 8/1964 | Irmscher | 53/14 |
| 3,237,550 | 3/1966 | Christopher | 99/287 |

(List continued on next page.)

FOREIGN PATENT DOCUMENTS

| | | |
|---|---|---|
| 0 448 325 | of 0000 | European Pat. Off. . |
| 0 489 554 | of 0000 | European Pat. Off. . |
| 1 281 927 | of 0000 | Germany . |
| 1 022 960 | 1/1958 | Germany . |
| 570 798 | of 0000 | Switzerland . |
| 76205985 | of 0000 | Taiwan . |
| 1 541 054 | of 0000 | United Kingdom . |
| 2 052 428 | of 0000 | United Kingdom . |
| 2 201 934 | of 0000 | United Kingdom . |
| 2 202 819 | of 0000 | United Kingdom . |
| 2 231 023 | of 0000 | United Kingdom . |
| 809573 | of 0000 | United Kingdom . |
| 962038 | of 0000 | United Kingdom . |
| 1 550 381 | 8/1979 | United Kingdom . |
| 2 049 547 | 12/1980 | United Kingdom . |
| 2 151 214 | 7/1985 | United Kingdom . |
| WO 92/06903 | of 0000 | WIPO . |
| WO 92/14649 | of 0000 | WIPO . |
| WO 93/19997 | of 0000 | WIPO . |
| WO 94/22721 | of 0000 | WIPO . |

OTHER PUBLICATIONS

Copending application Serial No. 08/122,034.
Copending application Serial No. 08/434,887.
Copending application Serial No. 08/434,655.
Derwent Abstract of JP 5044111.

*Primary Examiner*—Nasser Ahmad
*Attorney, Agent, or Firm*—James J. Farrell

[57] ABSTRACT

A tagged packet carries a tag which is attached to the main body of the packet by a thread. The thread comprises polypropylene so as to be attachable by heat sealing to the body. The body is made up of layers of sheet material also comprising thermoplastic material to allow the body to be closed by heat seals. The thread is secured to the f ace of the body at one edge at the same time as that edge is heat sealed and the heating for the thread seal is applied from the opposite face of the body whereas the adjacent regions of edge seal spaced from the thread has the heating applied through the first face. This arrangement gives closer control of the different conditions required for securing the thread and for sealing together only the sheet material of the body.

9 Claims, 3 Drawing Sheets

U.S. PATENT DOCUMENTS

| | | | |
|---|---|---|---|
| 3,283,672 | 11/1966 | Mueller | 93/35 |
| 3,316,686 | 5/1967 | Welin-Berger | 53/28 |
| 3,332,204 | 7/1967 | Frank | 53/180 |
| 4,394,204 | 7/1983 | Hutcheson | 156/275.1 |
| 4,415,597 | 11/1983 | Romangnoli | 426/394 |
| 4,506,490 | 3/1985 | Klar | 53/134 |
| 4,828,851 | 5/1989 | Romagnoli | 426/79 |
| 4,829,742 | 5/1989 | Romagnoli | 53/134 |
| 4,961,301 | 10/1990 | Bonomelli | 53/413 |
| 5,135,762 | 8/1992 | Vernon et al. | 426/79 |
| 5,366,741 | 11/1994 | Van Der Zon | 426/79 |

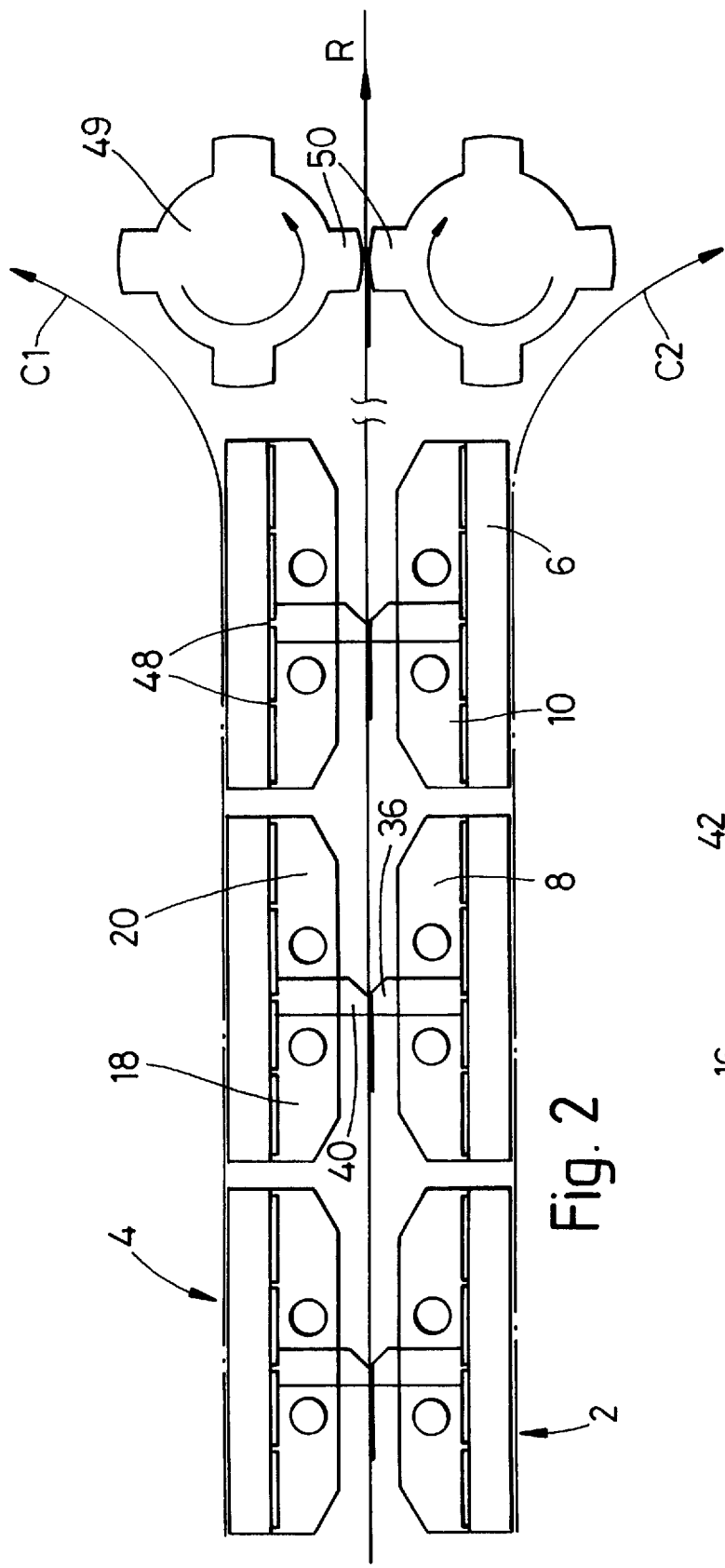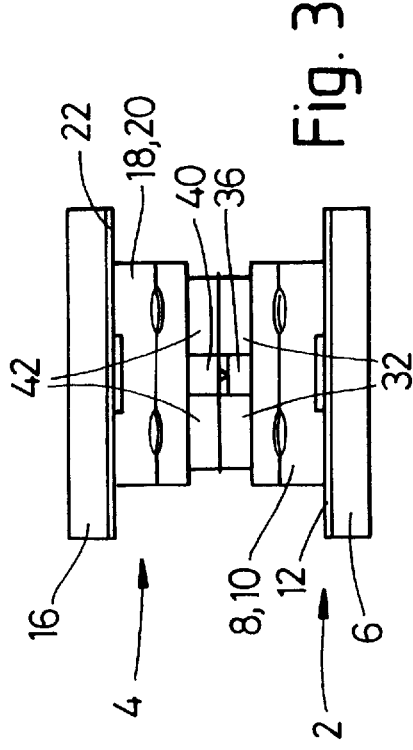

HEAT SEALING OF THREAD TO A WEB

This is a continuation, application of Ser. No. 08/434,956, filed May 4, 1995, now abandoned,.

This is a Divisional application of Ser. No. 08/122,034 filed on Sep. 14, 1993 now U.S. Pat. No. 5,439,529.

BACKGROUND OF THE INVENTION

This invention relates to a method and means for performing heat sealing operations.

The heat sealing of a pair of webs containing thermoplastics material by a pair of clamping jaws, at least one of which is heated, is a well known technique. It is also known to employ threads made of a thermoplastics material which are heated while being pressed into place to secure them by adhesion of the softened material.

While both these processes have been practised successfully in themselves, problems can arise if it is required to secure a thread in place on a heat-sealed seam. The thermoplastic thread if melted may shrink away from the heat sealing device and so be attached, at best, only insecurely. If this does not happen, it may stick to the heating device in contact with it, again giving an insecure attachment but also contaminating the apparatus. The use of threads made of a mixture of thermoplastic and non-thermoplastic materials might avoid these problems but it is found they cannot in any case adhere securely by heat to a paper web.

SUMMARY OF THE INVENTION

According to one aspect of the present invention, a method of attaching a thermoplastic thread to a web is provided in which the thread and web material are held between a pair of opposed heat sealing elements with the thread on one face of the web and heat being applied from the element on the opposite face of the web to render the thread plastic and cause it to adhere to the web material.

It is found, surprisingly, that when employing this method it is possible to avoid sticking of the thread material to either of the heat-sealing elements between which it is held and it is also possible to avoid the material shrinking away from the heat-sealing region in a molten state.

Preferably, the heating step is followed by a, step in which pressure and cooling is applied to complete is the attachment of the thread. For uniformity of results, it is desirable that this step is performed with the web and thread gripped in a predetermined sized gap.

As applied to a process in which the thread extends along a continuous tubular web which is to be sealed transversely at intervals to define a series of separate compartments and the thread is to be attached to each of the compartments, the transverse seals may be completed at the same time as the attachment of the thread by the use of at least one further pair of sealing elements, which will normally be required to operate at a different temperature and pressure than those for attaching the thread.

The thread may be composed of a single polymer, polypropylene being a preferred material. However, there can be advantages if the thread is composed of a plurality of thermoplastic materials having differing melting points, so that the thread is only partly melted when it is heat sealed in place.

Apparatus according to the invention for attaching a thread at one or more regions intermediate the width of a web and for sealing transversely across the web, may thus comprise a plurality of discrete but contiguous heat-sealing devices for heating successive portions across the width of the web, each said device comprising a heating element and anvil element adapted to be disposed on opposite sides of the web to engage between them the portions of the assembly in the respective zones, means being provided to press the web between the elements at the or each zone other than the zone to be occupied by the thread and said latter zone having the heat-sealing element set at a wider spacing than the opposed elements of the or each other of said zone.

In a further aspect, the invention also includes a method of attaching a thermoplastic thread to a web in which the thread and web material are held between a pair of opposed heat sealing elements with the thread on one face of the web and heat being applied from the element on the opposite face of the web to render the thread plastic and cause it to adhere to the web material.

The invention will be described in, more detail by way of example with reference to the accompanying drawings.

BRIEF DESCRIPTION OF THE DRAWINGS

FIG. 2 is a schematic side view of an apparatus according to the invention for producing the packet of FIG. 1, FIG. 3 is a transverse view of the heat sealing devices of the apparatus in FIG. 2.

DESCRIPTION OF THE PREFERRED EMBODIMENT

Figure 1:
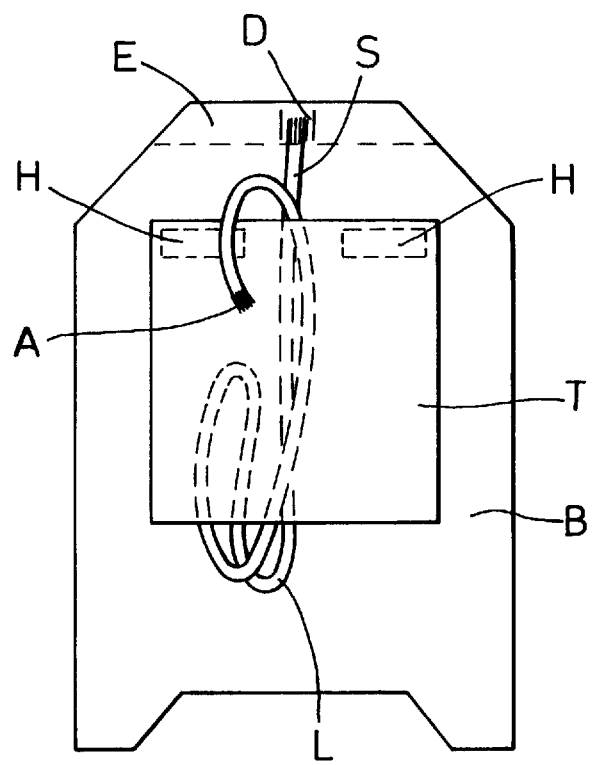
FIG. 1 shows a packet which has been produced using the apparatus to be described.
Figure 4:
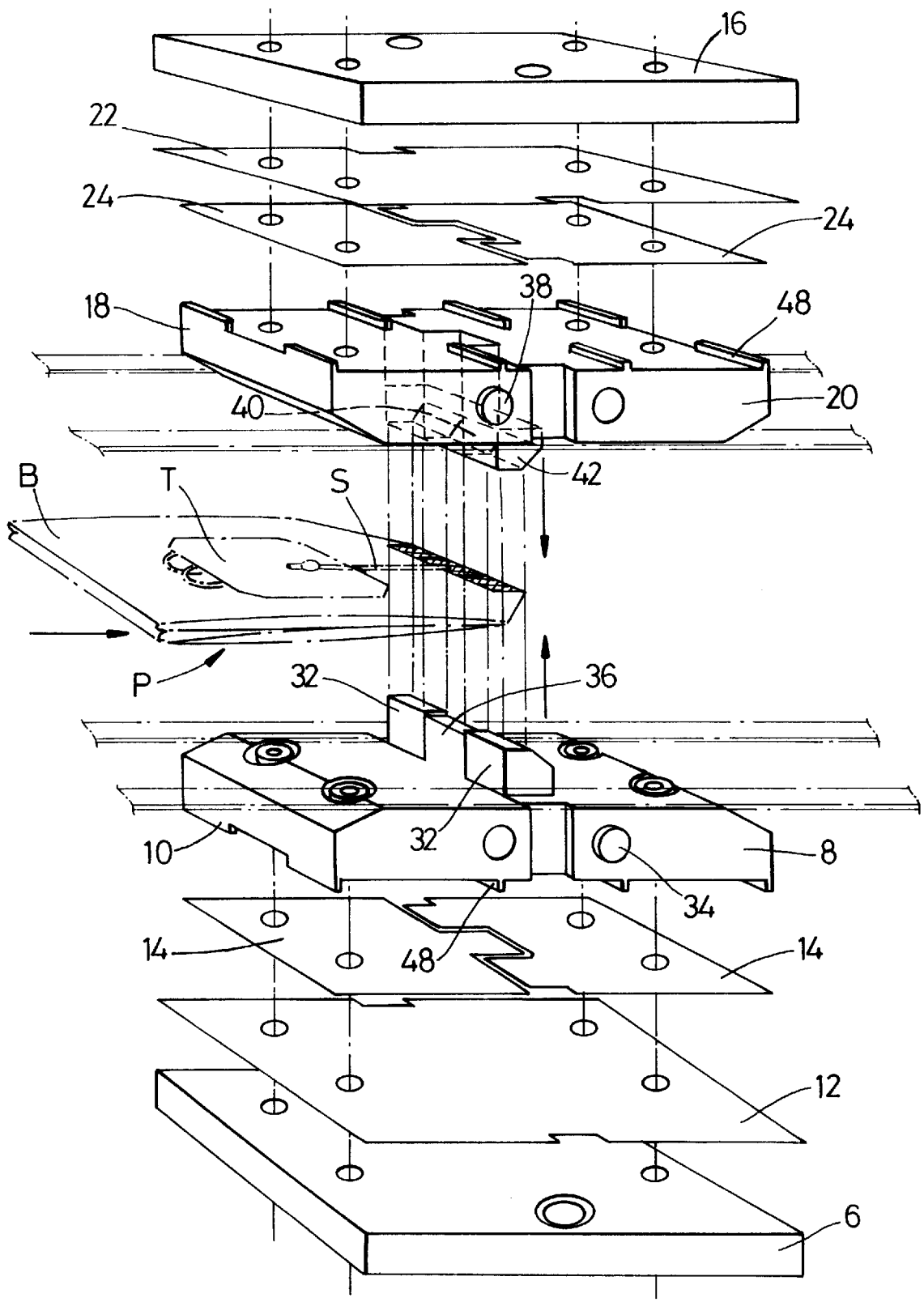
FIG. 4 is an exploded view of the devices of FIG. 3.

The packet illustrated in FIG. 1 has a double-compartmented form described in more detail in EP 448325A is but it can take any desired form. It comprises a main body B which is formed from two superimposed webs of a sheet material which may have heat-sealing properties, and which contains, for example, an infusion material. A tag T is loosely tacked by heat seals H to the main body but is attached more securely to it by a heat seal A to a thread S partly gathered in a loop L under the tag. The thread is secured to the body by a heat seal D at one end and that end of the body to be closed by heat-seal E welding the webs together. For this purpose, the thread and the sheet material of the body comprise thermoplastic material, such as polypropylene. For example the sheet material may have 25% thermoplastic material and the thread more, possibly even 100.

The thread may contain polypropylene in admixture with a further material which is not subject to melting at the melting point of the polypropylene, eg. a polyester having a melting point some 20° C. or more higher than the melting point of the polypropylene. The strength of the thread in the region of the heat seal can be improved this way. To ensure satisfactory heat sealing it is desirable that the thread is not coated with lubricants, as is commonly done in the production of thermoplastic filaments.

The surface of the tag facing the thread may be treated to be more receptive to bonding with the is thermoplastic material of the thread. As examples, the surface of the tag facing the thread may have a coating of a thermoplastic material such as polypropylene or it may be roughened tr made porous to facilitate the penetration of the heat-sealable thread material into the surface when the thread has been softened by heat.

Although the thread is held mainly underneath the tag before use, it may be preferred to weld it detachably to the body to ensure it does not become displaced inadvertently with the risk of snagging on extraneous objects. This can conveniently be done on the exposed portion of the thread loop below the tag.

The heat seals are achieved by separate sealing operations performed simultaneously between the thread and the body and between the two webs of the body to each side of the thread, as will now be described.

The apparatus takes the form of two circulating belts C1,C2 on which a series of heat seal operating members are secured, pairs of opposed members 2,4 on the two belts forming the heat sealing units. The belts extend on opposite sides of a path R along which sheet material of the bodies B enters as a continuous tubular web, being converted into partly completed packets P as they progress through the apparatus, still as a continuous web, and in this respect the belts with their operating members may be arranged similarly to the circulating heat sealing devices for performing the finishing web sealing and separating operations described in EP 448325, urgeing together correspondingly the heat seal operating members 2,4 to secure the thread to the web and to seal the ends of the web compartments. The drawings do not show the guides at the sides of the apparatus for guiding the web of uncompleted packets between the two belts.

Each member 2 of the lower belt comprises a lower mounting plate 6 through which it is attached to its belt and a lower heater element 8 and lower anvil element 10 which jointly extend over substantially the area of the mounting plate. The heater element and the anvil element lie close to one another but there is an air gap between them. Between the plate 6 and the elements 8,10 are a thermal insulating sheet 12 and for the heater element and/or the anvil element at least one radiating plate 14. Each radiating plate has essentially the same plan form as its associated element. The components of the operating member 2,4 are clamped together by bolts (not shown) between the lower plate 6 and the elements 8,10.

Each member 4 of the upper belt similarly comprises an upper plate 16 through which it is attached to its belt, an upper heater element 18 and closely nested anvil element 20, and an insulating sheet 22 and radiating plates 24 interposed between the plate 16 and the elements 18,20. The radiating plates 24 also have plan profiles matching those of their respective elements 18,20.

The lower heater element 8 comprises a pair of upwardly projecting heating jaws 32 at its nesting boundary with the lower anvil element 10 and a cartridge heater 34 inserted into the body close to the jaws 32. The lower anvil element 10 has a central upwardly projecting anvil jaw 36 between the heating jaws 32. The upper heater element 18 disposed opposite the lower anvil element 10 has a cartridge heater 38 inserted into its body close to a central, downwardly projecting heating jaw 40 which is vertically coincident with the lower anvil jaw 36. The upper anvil element 20 similarly has a pair of downwardly projecting anvil jaws 42 on opposite sides of the heating jaw 40 and vertically coincident with the lower heating jaws 32.

In this arrangement, the upper heating jaw 40 and lower anvil jaw 36 form one heat-sealing device for a central zone and immediately adjacent to them is a second heat-sealing device formed by the lower heating jaws 32 and upper anvil jaws 42 for a pair of outer zones aligned with the central zone. Heat transfer between the heating jaw or jaws of one device and the adjacent anvil jaws or jaw of the other device is limited by the air gaps between the adjacent elements.

Base projections 48 on each of the elements 8,10,18,20 limit the conduction of heat away from the heater and anvil elements. The radiating plates provide a means of dissipating heat that has been transmitted from the elements.

The web of partly formed packets is fed between the heat seal operating members as the belts C1,C2 circulate, the members being oriented parallel to each other before they contact the web so that they close together moving perpendicular relative to the web. The web feed is synchronised with the movement of the belts so that the portions to have end seals formed between the opposed webs of the individual packets, and one end of each packet thread, are brought into register with the jaws of the successive operating members 2,4,.

The heat sealing of the thread to the web is performed by the central jaws 36,40 of the elements 10,18. That also seals together the two layers of the packet web,in the immediate vicinity of the thread, but the main side zones are sealed by the pairs of outer jaws 32,42 of the elements 8,20 to complete the packet end seal. This arrangement allows different heating temperatures to be chosen for the different zones of the end seal, in particular the central zone with the thread may be heated more intensively. A small gap is present between the central jaws 32,42 but the outer jaws are set without a gap to clamp the web material between them under pressure.

It will be noted from FIG. 3 that the web of partly completed packets progresses through the apparatus with the tag and thread on its lower face. The heating in the central zone occupied by the thread is applied through the jaw 40 of the upper element 18, ie. the thread is heated through the web material. It is found that this procedure is able to soften the thread so that it can adhere to the web but it does not stick to the cooler anvil element. Nor need it be subjected to heating conditions which would cause it to melt and shrink away from the contacting element. The heater element 18 is raised to higher heating temperature than the heater elements 8. For example, the jaws 32 may he heated to 180° C. but although the thread may be weldable at a temperature of about 160° C. it may be necessary to heat the jaws 40 to some 300° C. to transmit sufficient heat through the web, but the process gives a more secure and reliable attachment for the thermoplastic thread.

A pair of cold rollers 48 in the path of the packet web following the belts have control rings (not shown) on their mounting shafts which set the arms 50 of the rollers at a fixed minimum gap, eg. 0.2 mm. The rotation of the rollers is synchronised with the belts so that the arms pinch the still soft thread at each end seal to spread and to solidify it. This final step ensures the thread is securely and permanently connected before the packets proceed to the next stage of processing.

We claim:

1. A tagged article comprising a main body of web material and a tag detachably secured to the body, a length of thread for connecting the main body and the tag, said thread having opposite ends secured to the body and the tag, said thread being composed of an admixture of a plurality of thermoplastic materials, said materials having different melting points from each other and said thread being heat sealed to the body and the tag at said opposite ends.

2. An article according to claim 1 wherein the tag comprises heat sealing material for said attachment of the tag to the thread.

3. An article according to claim 1 wherein the plurality of thermoplastic materials of the thread comprise polypropylene.

4. A tagged article comprising a main body of a sheet material or web, a tag detachably secured to said body, and a thread secured at opposite ends to the tag and the body, an intermediate portion of the thread between said ends being sandwiched releasably between the tag and the body in the form of a loop comprising a pair of lengths of thread and a curved intermediate portion of thread extending between and joining respective ends of said lengths of thread, both of said lengths of thread being turned back on themselves at a region intermediate their extent to give said loop a folded form.

5. An article according to claim 4 wherein the thread is detachably secured to the sheet material or web intermediate its length.

6. A tagged article comprising a main body of a sheet material or web, a tag detachably secured to said body, and a thread having opposite ends secured to the tag and the body respectively, an intermediate portion of the thread between said ends being sandwiched releasably between the tag and the body in the form of a loop comprising a pair of lengths of thread and a curved intermediate portion of thread extending between and joining respective ends of said lengths of thread, said loop being folded on itself at a region intermediate the extent of said pair of lengths, thereby reducing the length of the loop on the article.

7. A tagged article comprising a main body of a sheet material or web, and a tag detachably secured to said body, a thread having opposite ends secured to the tag and to the body respectively, an intermediate length of the thread between said ends being sandwiched releasably between the tag and the body in the form of an elongate loop comprising a pair of thread portions extending from said secured ends of the thread, said thread portions each being folded on itself at a region intermediate the lenght of the thread portion.

8. A tagged article comprising a main body of a sheet material or web, and a tag detachably secured to said body, a thread having opposite ends secured to the tag and the body respectively, an intermediate length of the thread between said ends being sandwiched releasably between the tag and the body in the form of a loop comprising two opposite side portions that are folded over on themselves at a region intermediate their length whereby to reduce the length of the loop.

9. A tagged article comprising a main body of a sheet material or web, and a tag detachably secured to said body, a thread having opposite ends secured to the tag and to the body respectively, an intermediate length of the thread between said ends being sandwiched releasably between the tag and the body in the form of an elongate loop, having a pair of lengths of thread and a curved intermediate portion of thread extending between and joining respective lengths of said thread, said loop being folded over on itself at a region intermediate its length whereby to reduce the length of the loop.

* * * * *